United States Patent [19]
Cramer et al.

[11] 3,732,400
[45] May 8, 1973

[54] PUNCHED CARD READER WITH A DRUM-SHAPED, ROTATABLE CARD MAGAZINE

[75] Inventors: Bernhard Cramer, Pforzheim-Sonnenberg; Heinrich Deimling, Singen; Rudi Hauf, Pforzheim, all of Germany

[73] Assignee: International Standard Electric Corporation, New York, N.Y.

[22] Filed: Apr. 22, 1971

[21] Appl. No.: 136,464

[52] U.S. Cl. ..............................235/61.11 B, 200/46
[51] Int. Cl. ............................................G06r 7/015
[58] Field of Search.................235/61.11 B, 61.11 C, 235/61.11 R, 61.11 E, 61.11 D, 61.6 R; 200/46

[56] References Cited

UNITED STATES PATENTS 3,573,435 4/1971 Heinz et al....................235/61.11 C
3,157,777 11/1964 Rabinow.......................235/61.11 E
3,065,905 11/1962 Stern...........................235/61.11 D

OTHER PUBLICATIONS

IBM Tech. Discl. Bull'n. entitled "Random Access Tape Filg.," by May and Swearinger, Vol. 9 No. 12, May 1967, pages 1717–1718.

*Primary Examiner*—Thomas A. Robinson
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A punched card reader wherein the cards are received in a horizontally arranged exchangeable carousel-type cassette which is provided, at its outer rim, with radial guide slots to be fed from above. The cards are evaluated by a contact spring set arranged below the path of rotation of the cards, which is vertically adjustable. It reads the cards successively during the periods of rest in a step-by-step reading cycle.

7 Claims, 5 Drawing Figures

INVENTORS
BERNHARD CRAMER
HEINRICH DEIMLING
RUDI HAUF

BY Mark L. Hopkins

AGENT

INVENTORS
BERNHARD CRAMER
HEINRICH DEIMLING
RUDI HAUF

BY [signature]

AGENT

INVENTORS
BERNHARD CRAMER
HEINRICH DEIMLING
RUDI HAUF

BY

AGENT

PUNCHED CARD READER WITH A DRUM-SHAPED, ROTATABLE CARD MAGAZINE

The present invention relates to a punched card reader with a drum-shaped, rotatable card magazine into which the punched cards to be evaluated have been sorted in a certain order.

A punched card reader of the above kind is described in the German Pat. 1 118 250.

In the embodiment of the character generator for given teletype messages, which is described there, a vertically freely rotatable magazine with a plurality of punched cards is provided. In order to prevent the cards from falling out, they are threaded in groups on card holding bars annularly adjoining each other. For the evaluation of a card, the magazine must be manually rotated until the respective card is in front of the card receiving device, into which it is swung, again by hand, in an axial direction. The reading operation and the swinging back into the magazine are then performed automatically.

The above-described card reader is disadvantageous in that, on the one hand, threading of the punched cards is required for structural reasons, which makes it very difficult to exchange the cards. On the other hand, the position of the punched card to be read must be changed, which must be done by hand. In addition, the replacement of the entire magazine, which is desirable for other applications, is not possible.

These disadvantages are avoided in the punched card reader according to the invention, which is characterized in that the card magazine is designed as a flat, replaceable cassette which, at its outer rim, is provided with radial card guide slots to be fed from above, that the punched cards being in the guide slots are accessible from below in the region of the code holes, that the reading station consists of a stationary, vertically adjustable contact spring set arranged below the path of rotation of the cards and a holding-down element arranged above the path of rotation of the cards, and that the cassette is rotatable step by step via a controllable drive.

This design has the advantage that the position of the punched cards, once they are sorted, is not changed any more, whereby a faster reading cycle is obtained. In addition, it is possible to exchange cards or refill the cassette at a minimum expenditure of work, which is supported by the exchangeability of the cassette.

The invention will now be explained in more detail with reference to an embodiment thereof in conjunction with the accompanying drawings, in which.

Figure 1:
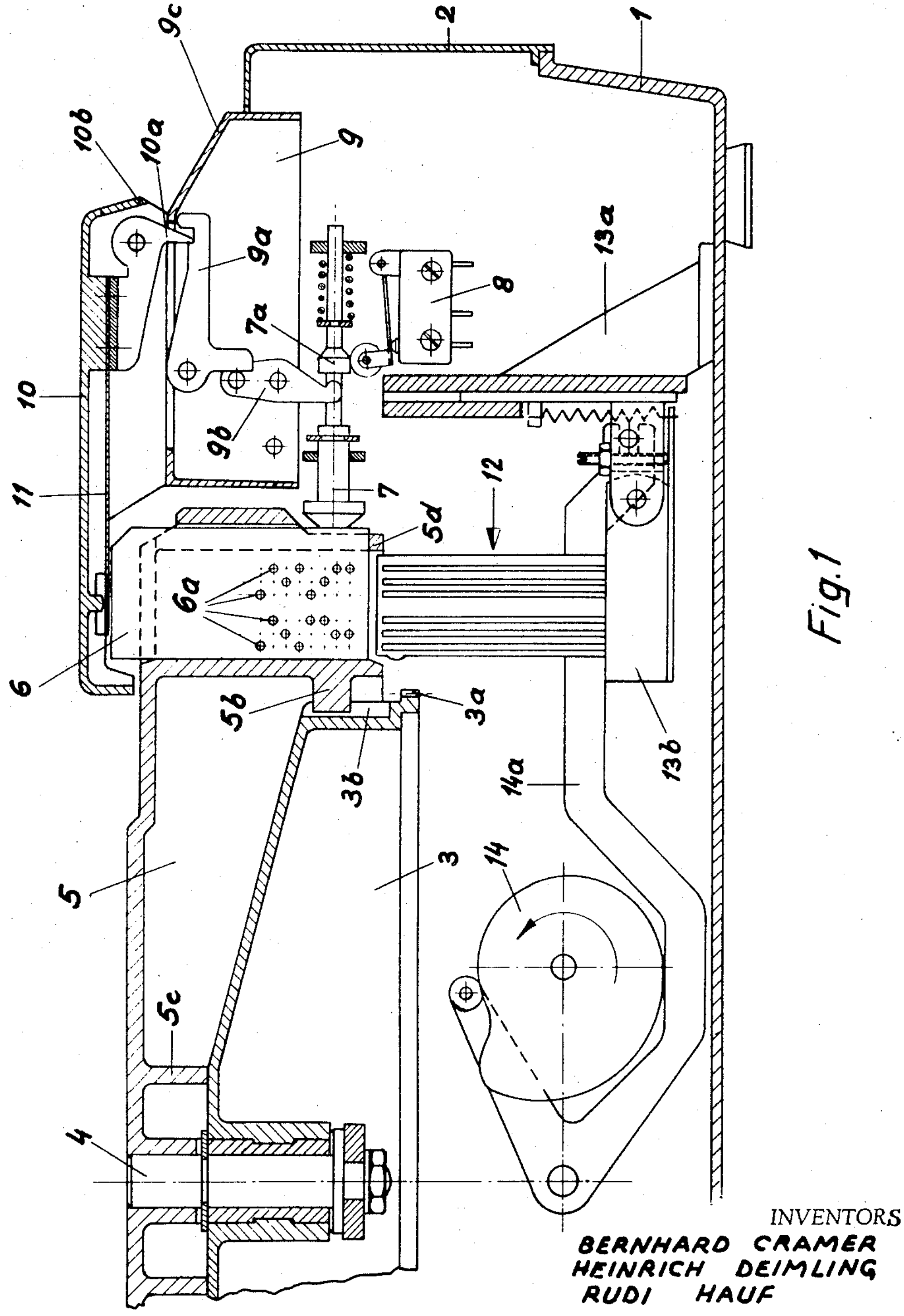
FIG. 1 is a schematic sectional view of a punched card reader according to the invention.
Figure 2:
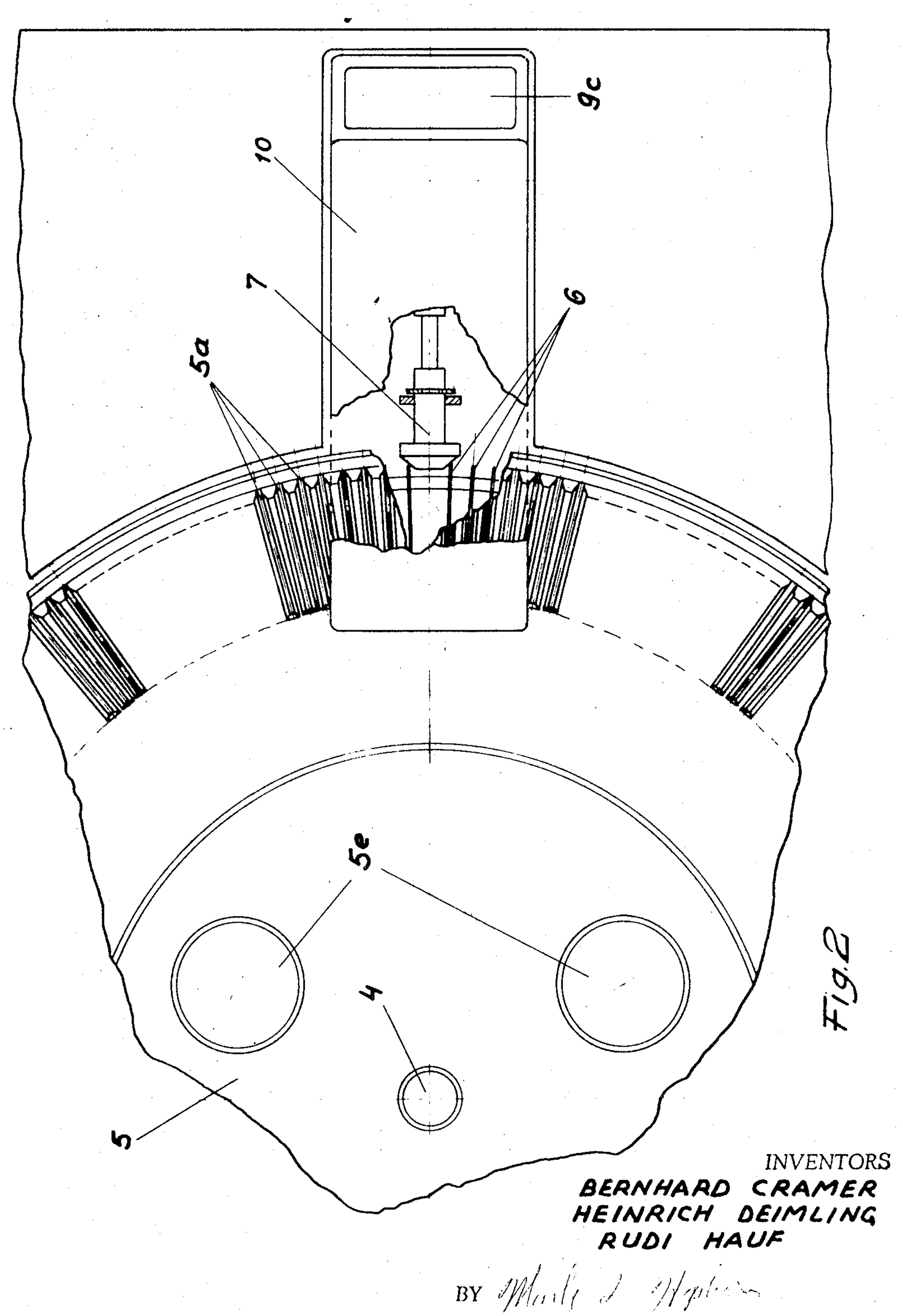
FIG. 2 is a partial top view of the reader of FIG. 1.
Figure 3:
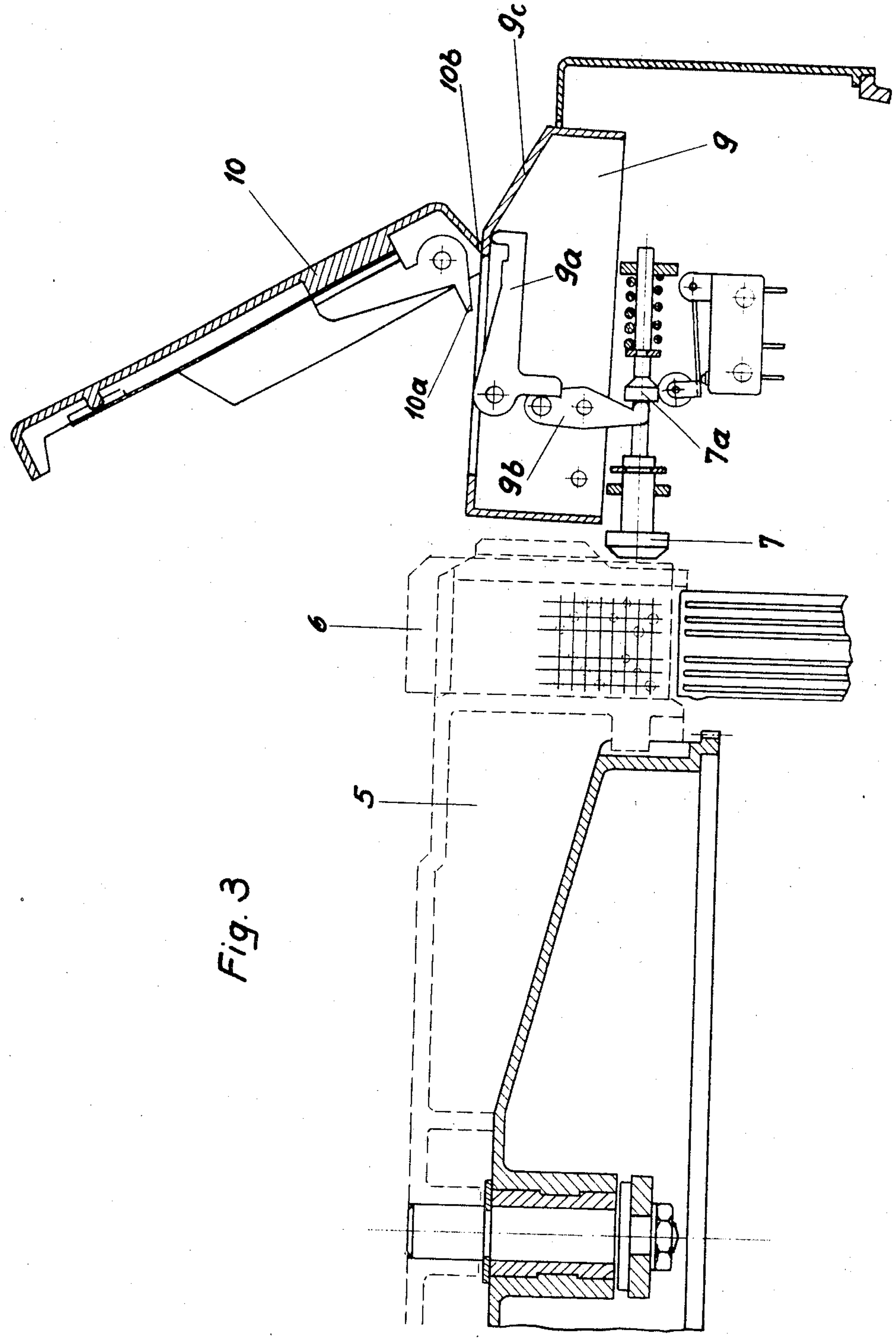
FIG. 3 is a partial view of the reader of FIG. 1, with the cassette having been lifted off.
Figure 4A:
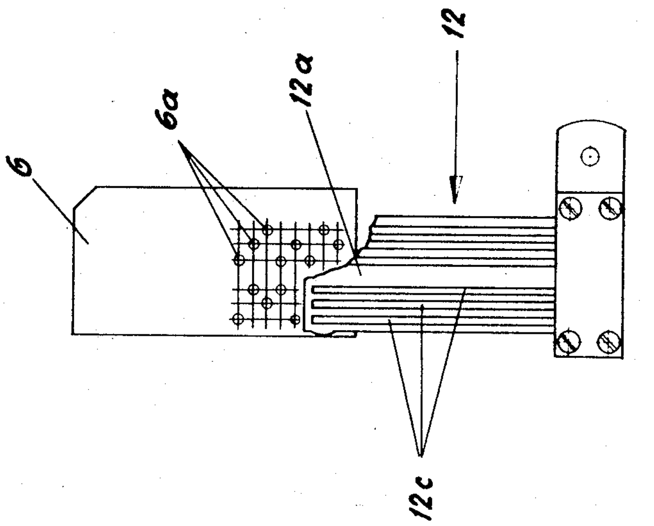
FIGS. 4*a* and 4*b* are a side view and a sectional view, respectively, of the contact spring set for reading the punched card coding as used in the reader shown in FIG. 1.
Figure 4B:
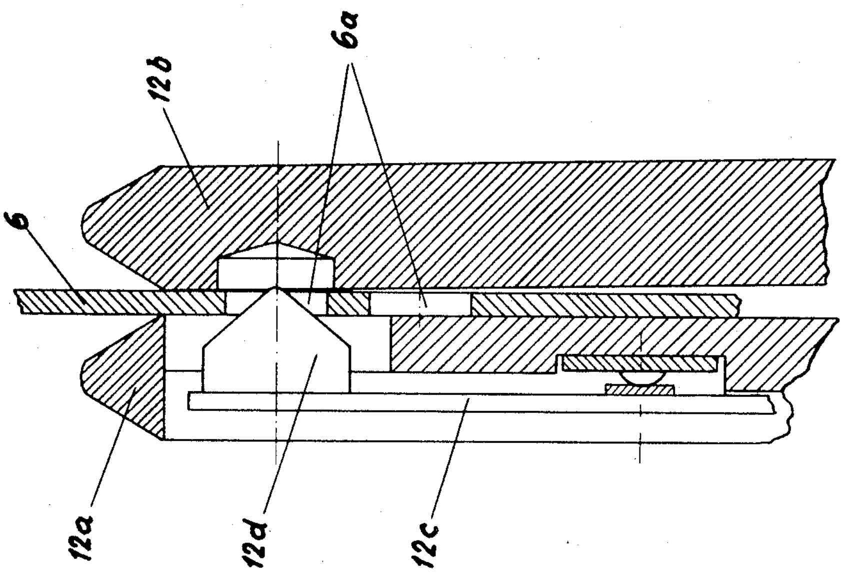

FIGS. 1 to 3 show the basic structure of the punched card reader. In a housing comprising base 1 and cover 2, a driving plate 3 is freely rotatably mounted on an axle 4 stationarily arranged in the base 1. The outer front surface of the driving plate 3 is provided, at certain intervals, with drive slots 3*b* while the lower rim of the plate 3 is designed as a gear rim 3*a*, via which the plate 3 can be advanced in steps by a stepping motor (not shown).

A round cassette 5 can be slipped on the end of the axle 4 projecting from the driving plate 3. It is supported via an intermediate annular extension 5*c* by the driving plate 3. At the same time, it engages one of the slots 3*b* of the plate 3 through at least one driving lug 5*b*.

According to FIGS. 1 and 2, the cassette 5 is provided at its outer rim with radial guide slots 5*a* to be fed from above, which serve to receive punched cards 6. The internal longitudinal edges of the slots serve as reference edges, against which the cards 6 in the range of the reading station are forced by a resiliently supported card feeler 7. In the vertical plane, the position of the cards 6 is determined by the right corner resting on the outer rim of the cassette 5*d*. Otherwise, the punched cards being in the guide slots 5*a* are freely accessible from below in the range of the code holes 6*a*.

At the level of the card feeler 7 and below the path of rotation of the cards, there is arranged a contact spring set 12 which is vertically adjustable via a parallel guideway 13*a* and 13*b*. The elevating motion of the contact spring set 12 is controlled via an motor-powered cam plate drive 14 and 14*a*.

Flush with the contact spring set 12 and above the path of rotation of the cards, there is a resiliently supported holding-down element 11, which forms a unit with a cover flap 10 extending over the card path. The flap 10, which is under the influence of a spring urging same to the open position, is held in the operating position shown in FIGS. 1 and 2 by the engagement of a locking hook 10*a* with a stop element 9*a* of a key 9. In this operating position, the holding-down element 11, whose edges are slightly bent upwards in the card region, rests on the upper edge of the punched cards 6 being within the reading range, thus ensuring that the cards 6 remain in a defined position during reading by the contact spring set 12.

The flap 10 is opened via the key 9 which, through the pressure of a finger on the oblique keying surface, swings clockwise around the pivot on the left. Thus, the stop-lever 9*a* resting against the inside of the key housing is carried along and swivelled so far that the hook 10*a* is released and the flap 10 bounds up under the influence of its torsion spring, as shown in FIG. 3. In this position of the flap 10, the key 9 is locked in the depressed position via the rear edge of the flap. As a result, a connecting link 9*b* swung counterclockwise by the stop lever 9*a* lifts the card feeler 7 from the cards 6 via an annular cam 7*a*, so that the cassette 5 can be exchanged without difficulty. The latter operation is performed in a very simple manner through gripping holes 5*e* arranged in a triangle in the cover surface of the cassette 5 (FIG. 2).

The punched cards 6 in the cassette 5 are evaluated as follows:

With the switching-on or starting of the equipment for the transmission of the information contained in the sorted-in cards 6, the arbitrarily slipped-on cassette 5 is turned by a continuous step-by-step action of the driving plate until the first card 6 reaches the reading position. This is indicated by the card feeler 7 which is pushed, e.g. by the first card, from the position shown in FIG. 2 back to the position shown in FIG. 1. By a switch 8 operated via the annular cam *7a*, this is indicated to a central stepping unit (not shown) which prevents the cassette from being advanced any further and initiates the reading of the first punched card 6 being in the evaluating position. The cam plate 14, which is rotated thereby, lifts the contact spring set mounted on the parallel guideway 13*a*, 13*b* in a continuous movement. Thus, as shown in FIGS. *4a* and *4b*, the laterally precisely guided punched card 6, which is fixed by the holding-down element 11, moves between the contact plate 12a and the outer support 12*b*, forming the contact set 12. The contact springs 12 *c*, which are provided at their upper ends with feeler nipples 12*d* as shown in FIG. *4b*, project into opposite cavities of the outer support 12*b*. As the card 6 enters between the plate 12*a* and the outer support 12*b* in the course of a reading, the nipples 12*d* first are all pushed back by the lower card edge, all contact springs 12*c* thereby being lifted from their opposite contacts. In the course of the further upward movement of the set of contacts 12, that contact closes temporarily whose nipple 12*d* finds a code hole *6a*. Thus, the individual code combinations in the card 6 are read successively and evaluated in known manner. The shape of the cam plate 14 is such that, after reading, the set of contacts 12 rapidly returns to its starting position.

This is followed by at least one step of the cassette 5 depending on whether or not the next guide slot *5a* is provided with a card 6. For each card detected via the card feeler 7, the above-described reading cycle repeats itself until the equipment is automatically switched off by a special card indicating the end of the card sequence.

At a point before the reading station in the direction of the cassette 5 which can be well seen from the operating side, there is arranged, below the path of rotation of the cards, an inclined ramp (not shown), by which the cards 6 are successively lifted out. Thereby, on the one hand, any print on the upper end of the edge is made visible and, on the other hand, the removal of the single card 6 is facilitated.

What is claimed is:

1. A punched card reader having a reading station and a drum-shaped rotatable card magazine into which coded punched cards to be evaluated have been sorted in a predetermined order, comprising the card magazine being designed as a flat, replaceable cassette which, at its outer rim, is provided with radial card guide slots to be fed from above, the punched cards in the guide slots being accessible from below in the region of the code holes thereof, with the reading station consisting of a stationary, vertically adjustable contact spring set arranged below the path of rotation of the cards and a card hold-down element arranged above the path of rotation of the cards, the cassette being rotatable step by step by way of a controllable drive triggered for step-by-step movement in dependence on the presence of the cards in the guide slot by way of a card feeler positioned to intercept the card edges proximate the reading station, said card feeler being arranged for radial movement which is detected by an associatively arranged switch.

2. The punched card reader according to claim 1 wherein the cassette is arranged to be demountably slipped onto the axle of a driving plate, and projects via at least one driving lug into drive slots of the drive plate, with the driving plate itself being rotatable step by step.

3. The punched card reader according to claim 2 wherein the driving plate is provided, at its lower edge, with a gear rim by way of which stepping is caused to be effected.

4. The punched card reader according to claim 2 wherein the cover surface of the cassette is provided with gripping holes arranged in a triangle by way of which removal of the cassette may be effected.

5. The punched card reader according to claim 1, wherein the contact spring set includes a contact plate provided with contact spring and of an outer support the contact springs being provided, at their free ends, with feeler nipples which project into corresponding recesses in the outer support.

6. The punched card reader according to claim 5, wherein the contact spring set is mounted on a parallel guideway, with the elevating movement being derived from a motor-driven cam plate.

7. The punched card reader according to claim 1, wherein the holding-down element forms a unit with a cover flap, which is in the open condition, locks a key in the operating position, such that in this position of the key, the card feeler is retracted via a connecting link.

* * * * *